E. M. CHAPMAN & C. E. COWAN.
TRUCK.
APPLICATION FILED AUG. 20, 1912.
1,081,093.
Patented Dec. 9, 1913.
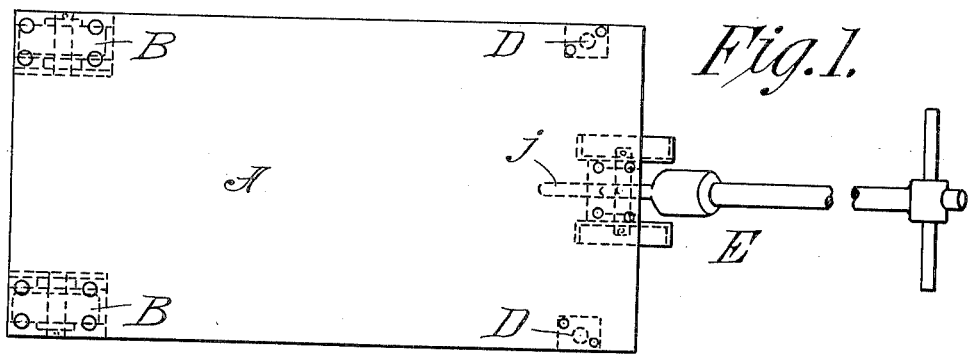
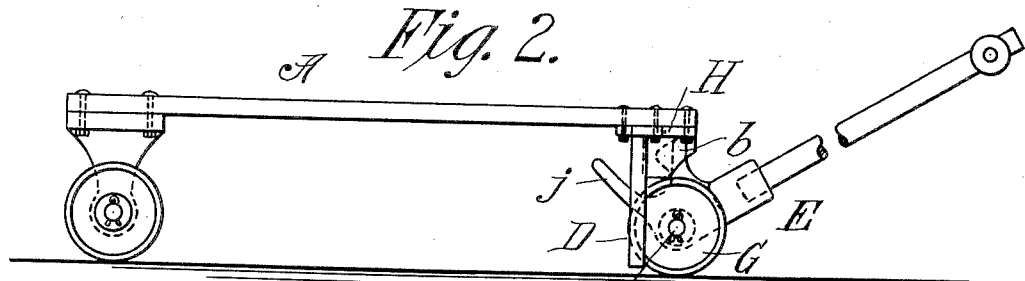
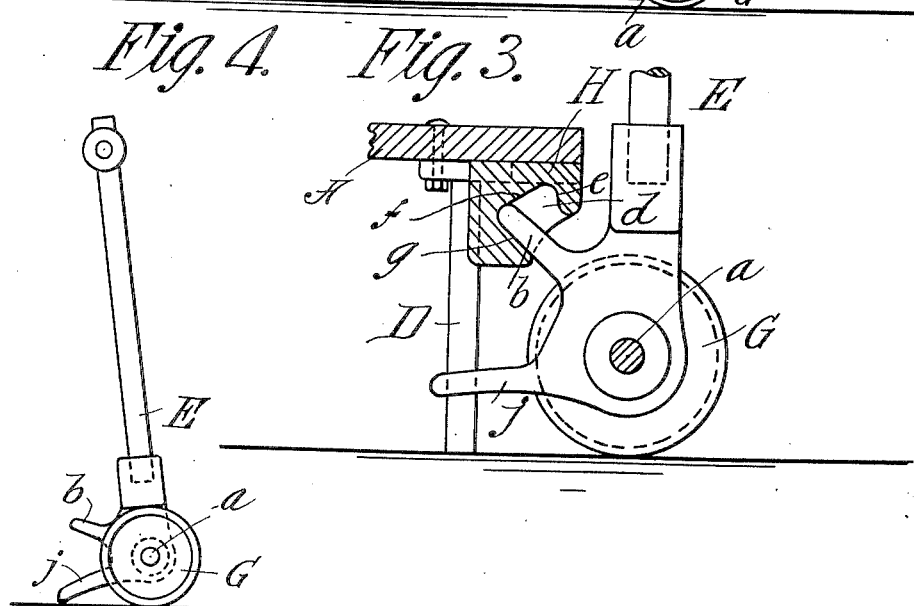
WITNESSES:
H. L. Sprague
W. P. Noble.
INVENTORS,
E. M. Chapman and
C. E. Cowan,
BY
ATTORNEY.

UNITED STATES PATENT OFFICE.

EUGENE M. CHAPMAN AND CHARLES E. COWAN, OF HOLYOKE, MASSACHUSETTS.

TRUCK.

1,081,093.  Specification of Letters Patent.  Patented Dec. 9, 1913.

Application filed August 20, 1912. Serial No. 716,027.

*To all whom it may concern:*

Be it known that we, EUGENE M. CHAPMAN and CHARLES E. COWAN, citizens of the United States of America, and residents of Holyoke, in the county of Hampden and State of Massachusetts, have invented certain new and useful Improvements in Trucks, of which the following is a full, clear, and exact description.

This invention relates to improvements in trucks of kinds commonly used in factories, warehouses, storage houses and baggage rooms,—the advantage attendant on the present invention being that a single handle, having a wheel or roller and detachably engageable with the forward portion of trucks, may serve as the draft or propulsion handle and also the front wheel or caster for a large number of trucks, lessening the aggregate cost of the latter, and by reason of the detachability of the wheel provided handle saving considerable space in the room or place where a number of trucks, when in disuse, are kept.

The invention is described in conjunction with the accompanying drawings and is set forth in the claims.

In the drawings:—Figure 1 is a plan view of the improved truck. Fig. 2 is a side elevation. Fig. 3 is a partial sectional elevation as taken centrally through the forward portion of the truck with the parts in their relative positions as placed preparatory to effecting the engagement of the handle with the forward portion of the truck body. Fig. 4 is a side view of the detachable handle and its appurtenances.

In the drawings, A represents the body of the truck, here shown as the platform type, although this invention is applicable in connection with many different kinds of trucks for different purposes, such as crate trucks, paper roll trucks, barrel trucks, shelf or library trucks, etc.

The body is supported at its rear on wheels B B as usual, and it has at or near its forward end, essentially one, but preferably a pair of oppositely located depending rigidly connected legs D D, the lengths of which are slightly less than the height at which the forward end of the body is supported when the wheel provided handle E is engaged with the forward portion of the body, and so that when the handle is disengaged the body will be supported with a very slight downward and forward inclination,—at its rear by the wheels and at its forward end by the legs which will prevent the truck from rolling away from its given set position.

The handle E comprises at its lower portion a casting, socketed to receive the handle proper and having an axle $a$ to receive the wheel or roller G, or preferably, and as shown, a double wheel.

The handle adjacent the wheel is made with a horn or projection $b$, which extends obliquely and upwardly relatively to the length of the handle, this member $b$ being, as understood, round in cross section.

The body has beneath the middle of its forward end portion a bracket H constructed with a downwardly opening recess $d$ formed with a forward depending vertical wall $e$ and a wall to the rear thereof having surfaces $f$ and $g$ angular to each other, the one $f$ being downwardly and rearwardly inclined and the other $g$ downwardly and forwardly inclined, and terminating at the mouth of the recess below the lower end of the wall $e$ and at a distance to the rear of such wall $e$ approximately equal to the diameter of the horn or projection $b$ of the handle.

On desiring to make use of any one of a number of the trucks standing in a warehouse or factory, the handle equipped with a wheel G and projection $b$ is brought to the position and the relation to the peculiarly equipped front portion of the truck body represented in Fig. 3; the handle is then swung from the vertical to the forwardly and upwardly inclined position required in use, and with the effect of causing through the cam or prying action of the end of the projection against the surface $f$ of the recess,—the bottom of the wheel acting as a rolling fulcrum, the elevation of the forward end of the truck body sufficiently to have the legs D, D, on which the body had rested, free and clear from the floor or ground.

The horn or projection $b$ being capable of a swiveling motion in the recess $d$ in which it is detachably engageable, the usual and requisite swiveling action of the body on its front wheel is assured.

The wheel provided handle is formed with an angular foot piece $j$ so that when the handle is detached from a truck, it may be stood up in an upright position, as shown in Fig. 4,—such foot piece acting as a clog to prevent the rolling action of the wheel on which the handle in part rests.

We claim:—

1. The combination with a truck having its body wheel-supported at the rear, and provided at its forward portion with one or more legs, of a handle provided with a wheel at its lower portion and with a projection extending obliquely upwardly relatively to the length of the handle, and the body having beneath its forward portion, a downwardly opening recess formed with a forward vertical wall and a wall to the rear thereof, having its lower edge located approximately as far to the rear of the forward vertical wall as the diameter of said handle projection, said handle projection being detachably engageable, and adapted to swivel in said recess.

2. The combination with a truck having its body wheel-supported at the rear, and provided at its forward portion with one or more legs, of a handle provided with a wheel at its lower portion and with a projection extending obliquely upwardly relatively to the length of the handle, and the body having beneath its forward portion, a downwardly opening recess formed with a forward vertical wall, and a wall to the rear thereof, having surfaces angular to each other, one being downwardly and rearwardly inclined and the other downwardly and forwardly inclined, and terminating at the mouth of the recess at a distance to the rear of the forward vertical wall, approximately equal to the diameter of said handle projection, said handle projection being detachably engageable, and adapted to swivel in said recess.

3. A truck having its body wheel supported at one end, and provided at the other end with a socket opening downwardly, and a wheeled handle member provided with an upwardly extending projection inclined to the handle, the socket having the wall adjacent the end of the body arranged to engage the said projection at its upper end portion, the opposite wall of the socket being arranged to engage the base of the upright projection on the side opposite to that engaged by the other wall, whereby to pivotally support the body on the handle member with the handle in an inclined position.

4. A truck having its body wheel supported at one end, and provided at the other end with a socket opening downwardly with its axis inclined to the vertical and the mouth of the socket higher at the portion adjacent the end of the body than at the opposite side, and a wheeled handle member provided with a projection inclined to the handle, the projection being arranged to enter said socket when the handle member is advanced to the body with the handle in an upright position, and to engage opposite portions of said socket mouth upon the handle being inclined away from the body, to thereby lift the body and pivotally support such end of the body.

Signed by us at Springfield, Mass., in presence of two subscribing witnesses.

EUGENE M. CHAPMAN.
CHARLES E. COWAN.

Witnesses:
WM. S. BELLOWS,
G. R. DRISCOLL.